No. 829,295. PATENTED AUG. 21, 1906.
L. ROEHR.
METAL WELDING MACHINE.
APPLICATION FILED MAY 13, 1905.
3 SHEETS—SHEET 1.
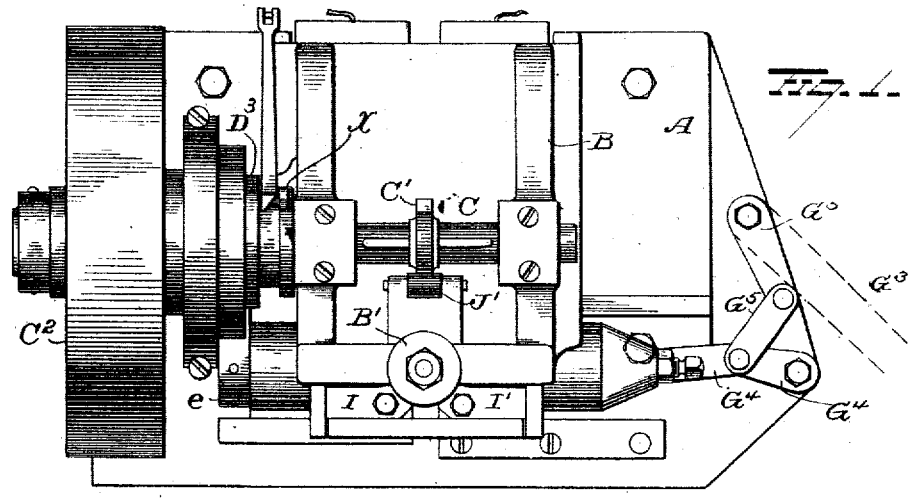
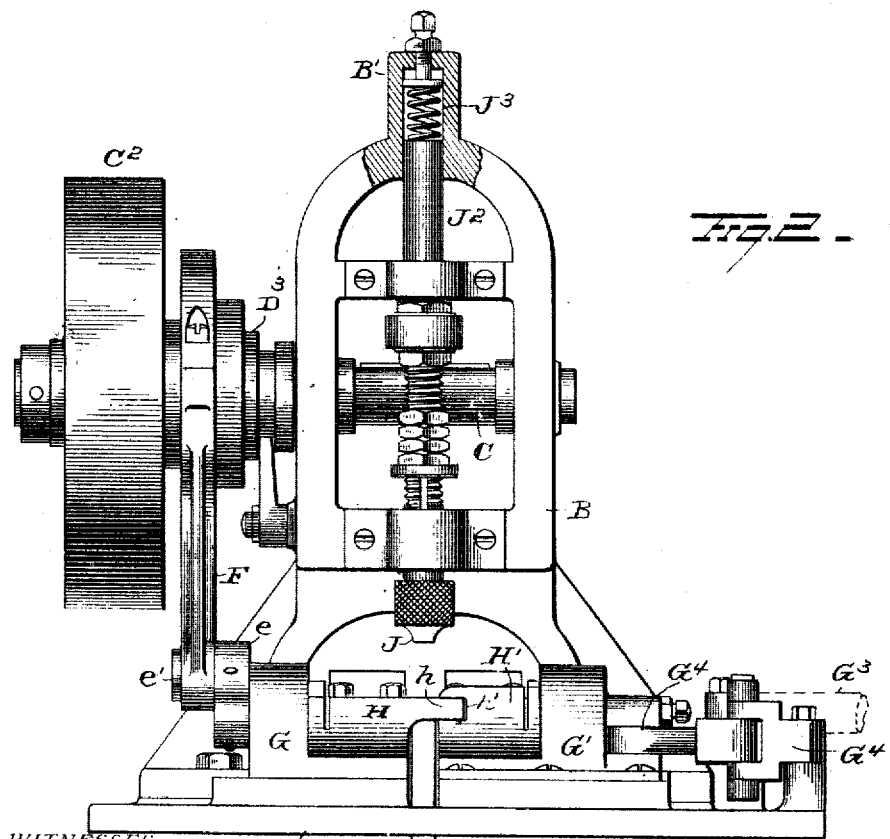

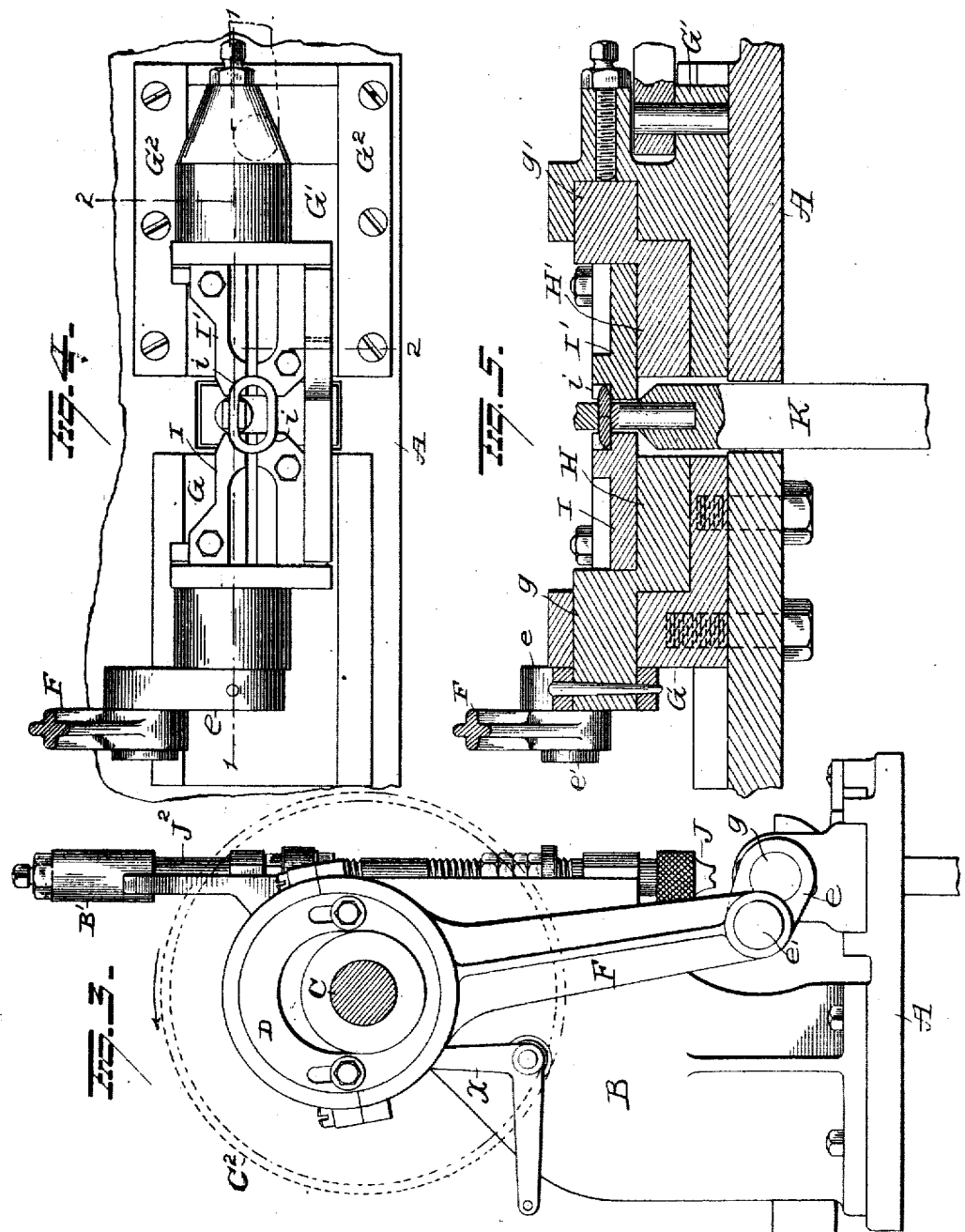

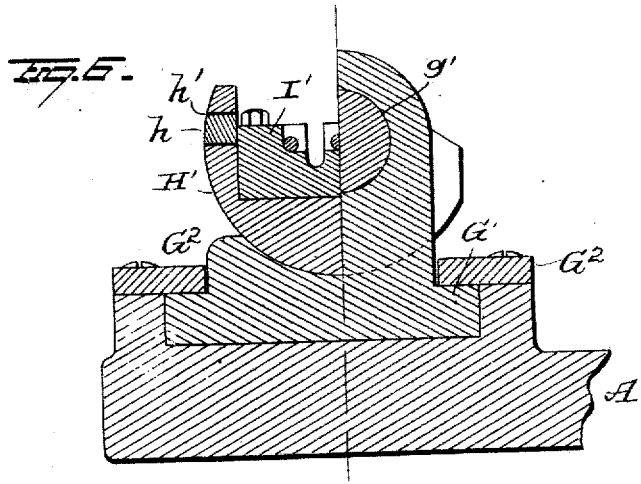
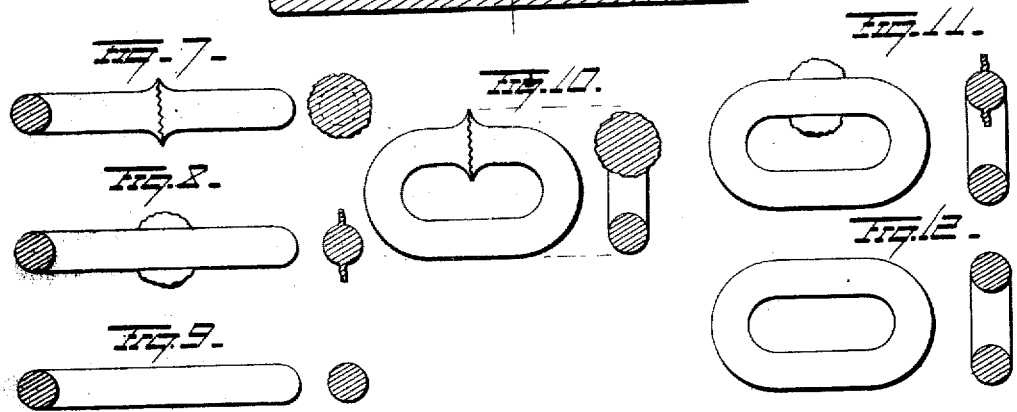
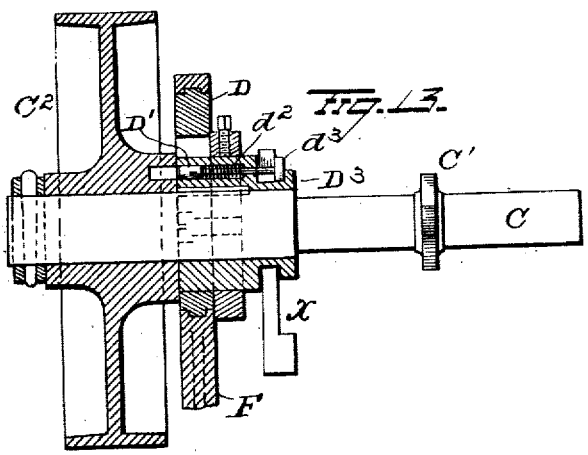
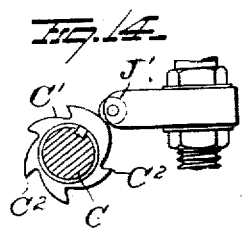

UNITED STATES PATENT OFFICE.

LOUIS ROEHR, OF STAMFORD, CONNECTICUT, ASSIGNOR TO THE YALE & TOWNE MANUFACTURING COMPANY, OF STAMFORD, CONNECTICUT.

METAL-WELDING MACHINE.

No. 829,295.     Specification of Letters Patent.     Patented Aug. 21, 1906.

Application filed May 13, 1905. Serial No. 260,264.

*To all whom it may concern:*

Be it known that I, LOUIS ROEHR, of Stamford, in the county of Fairfield and State of Connecticut, have invented certain new and useful Improvements in Metal-Welding Machines; and I do hereby declare the following to be a full, clear, and exact description of the invention, such as will enable others skilled in the art to which it appertains to make and use the same.

My invention relates to an improvement in metal-welding machines and while it is designed particularly for use in connection with electric welding-machines for welding chain-links I would have it understood that I do not limit the application of my improvement to chain-making machines nor to machines wherein the necessary heat is produced by electricity.

For the purposes of illustration I will, however, show and describe the improvement in connection with a machine for welding chain-links.

In the operation of the machines now in use for welding chain-links the assembled links in chain form are operated upon in succession as the chain is fed through and the free ends of the wire composing each link firmly welded together. In the welding operation the ends of the link are engaged between two vise or clamping jaws, one of which is movable, and is held there until sufficiently heated for welding purposes. After it has been heated, or during the operation of heating, the movable clamp is forced toward the fixed clamp, thus forcing the two highly-heated ends of the link together, which causes the metal to bulge out all around at the juncture, as shown in Figures 7 and 10, after which the hammer by a series of blows (usually five, given in rapid succession) forges or welds the joint and reduces the diameter of the bulged part to that of the wire composing the link, but leaves two fins projecting from the opposite sides of the welded joint, as shown in Figs. 8 and 11. After all the links of the chain have been thus welded the fins produced by the welding operation are removed by a separate and distinct operation.

The object of my invention is to produce a weld without any projecting fins; and my invention consists in means for moving the link relatively to the hammer and anvil during the operation of the hammer, thus causing the latter to smooth down by its succeeding stroke any projections or protuberances formed by the preceding stroke.

My invention further consists in the parts and combination of parts and in details of construction, as will be more fully described, and pointed out in the claims.

In the accompanying drawings, Fig. 1 is a view in plan of a welding-machine, showing my improvements thereon. Fig. 2 is a view in front elevation of same. Fig. 3 is a view in elevation, the belt-wheel being removed and the main shaft shown in section. Fig. 4 is a plan view of the cradle attachment with a chain-link in a position to be welded. Fig. 5 is a view in vertical section on line 1 1 of Fig. 4. Fig. 6 is a staggered cross-section on the line 2 2, Fig. 4. Fig. 7 shows in elevation and cross-section a rod or bar; and Fig. 10 similar views of a link, showing the bulge produced after the parts have been heated and forced together. Figs. 8 and 11 are similar views showing the weld after hammering by the machine and method now in use. Figs. 9 and 12 are corresponding views showing the weld produced by my improvement. Fig. 13 is a sectional view showing the means for clutching the pulley to the shaft, and Fig. 14 is a view showing the ratchet-wheel and tappet.

A represents the main bed-plate of an electric welding-machine to which is secured the upright frame B, carrying the main shaft C. This shaft C is provided with a wheel C', having a series of teeth or ratchets C², which latter are adapted to successively engage the tappet J' on the hammer-shank J², thus elevating the hammer-shank and its hammer and permitting it to drop, the downward movement of the shank and its hammer being accelerated by the spring J³, located in the housing B', which receives the upper end of the hammer-shank. In the operation of the machine the shaft C makes one complete revolution for one weld. Hence during this one revolution the hammer rises and falls the number of times corresponding to the teeth or ratchets C² on the wheel C'. In the machines in use at the present time there are five teeth on the wheel C'. Consequently five blows will be struck in rapid succession by the hammer during the operation of welding a single link, and while these blows are being struck the link is held stationary between clamps or vise-jaws. Consequently the blows all fall on one surface, which results in forcing the excess of metal out at the opposite sides of the weld and between the anvil and hammer, thus producing the fins. (Shown in Figs. 8 and 11.)

As before stated, the object of my invention is to produce the weld in such a manner as to prevent the formation of fins, and this I accomplish by mounting the clamp or vise-jaws in a rocking cradle, which latter rocks while the hammer is in operation, thus causing any excess of metal which has been forced out between the anvil and hammer to be obliterated by the next succeeding blow of the hammer.

Secured to the base A is the carriage G. This carriage may be adjusted for various sizes of links or wire, but remains fixed and immovable during the operation of the machine. Slidingly mounted on the base directly opposite carriage G is the carriage G'. This carriage, as shown in Figs. 2, 4, and 6, is held against displacement by the guide-plates $G^2$ and is connected, as shown in Figs. 1, 2, and 5, with the hand-lever $G^3$ through the toggle-links $G^4$ and $G^5$. With this arrangement it will be apparent that if the free end of lever $G^3$ be moved toward the machine, or to the left, the toggle-links $G^5$ will move the links $G^4$ into alinement, thus forcing the carriage G' toward the carriage G. Each carriage G and G' is provided with a bearing, in which are mounted the hubs g and g' of the sections H H' of the cradle. This cradle, as clearly shown in Fig. 6, is formed in the arc of a circle, with its hubs concentric with the circumference of the cradle, the tops of the carriages being concaved to conform to the cylindrical surfaces of the two sections of the cradle, thus forming solid and substantial supports for the latter at all times and under all conditions.

Secured within depressions in the upper surfaces of the cradle-sections H and H' are the jaws I I', which may be of any suitable form. These jaws are provided on their adjacent ends with shoulders $i$, on which the link being welded rests. As will be seen, the jaw I' is carried by the movable carrier G'. Consequently when the carrier is moved its jaw moves with it. The jaws are constructed to receive and clamp the rod or link to be welded, and in the present instance I have shown a link in position. This link when in position rests with the axis of its member to be welded in line with the axis of the hubs g of the cradle, as clearly shown in Figs. 4 and 5, so that when the cradle is rocked the link rocks on an axis coincident with the axis of the members to be welded. To clamp a link in position, the section G' of the carriage is moved in a direction away from section G. This movement of section G' separates the jaws I I', by which the link is held during the clamping operation, sufficiently to permit the link to drop therein. After the link has been placed between the jaws and properly heated the section G' of the carriage is forced toward the section G, thus bringing the two heated ends of the link into close contact, as shown in Fig. 10. During the welding operation which follows the clamping operation above described the ends of the members to be welded rest on the anvil K, which, as shown, passes up through the base A and between the carriages G and G' and cradle-sections H and H' and supports the link immediately below the hammer J. This anvil is vertically movable by a foot-lever or by automatic means (not shown) and is only supposed to be in its elevated position while the hammer is working.

Secured on the hub g of cradle-section H is the crank-arm $c$, having crank-pin $e'$, to which the pitman F is connected. This pitman is mounted at its upper end on a cam D, adjustably secured on the main shaft C. Hence when the shaft C is rotating a rocking movement will be imparted to the section H of the cradle. This section H is provided with a tongue $h$, (see Fig. 2,) which latter rests in the slot $h'$ in cradle-section H', so that a rocking motion imparted to the section H will be transmitted to the section H' by the tongue-and-slot connection $h$ $h'$, the latter also permitting of the free longitudinal adjustment of the cradle-section H'.

Loosely mounted on the main shaft C is the pulley $C^2$, and slidingly mounted in the cylindrical drum $D^3$, carrying the eccentric D, is the clutch-pin D', which latter is designed to enter a recess in the hub of pulley $C^2$ and lock the latter to the shaft C. The clutch-pin D' is normally held in engagement with the pulley by a spring $d^2$ and is provided at its outer end with a head $d^3$, which latter is designed to engage the beveled edge of the upright member of the bell-crank lever X. This upright member of lever X normally rests in a peripheral groove in the drum $D^3$, fixed to shaft C and in the path of the head $d^3$ of the clutch-pin D' and is removed therefrom by a foot-treadle, to which its horizontal member is connected The pulley $C^2$ is supposed to be constantly rotating. Hence by actuating lever X on its fulcrum the vertical member therefor will be withdrawn from the path of the head of clutch-pin, thus permitting the latter to engage the pulley and lock the latter to the shaft. After the parts have been thus started the bell-crank lever X should be released, thus permitting its vertical member of the bell-crank lever to fall into the path of the head of clutch-pin, thus withdrawing the pin and disconnecting the pulley and shaft at the completion of one full revolution of the shaft. During this revolution of the shaft the hammer J is actuated and the cradle rocked first in one direction and then in the opposite direction back to its normal position. This rocking of the cradle on an axis coincident with the axis of the two members of the rod or link being welded causes the link to be turned, thus presenting a new surface to the hammer and bringing any fins or enlargements produced by the previous blow onto the anvil or under the hammer, thus preventing the formation of the fins.

It is evident that many slight changes might be resorted to in the relative arrangement of parts herein shown and described without departing from the spirit and scope of my invention. Hence I would have it understood that I do not wish to confine myself to the exact construction shown and described; but, Having fully described my invention, what I claim as new, and desire to secure by Letters Patent, is—

1. The combination with an anvil and a hammer, of means, one on each side of the hammer and anvil, for holding one of the two parts to be welded, mechanism for forcing such holding means toward each other, and means actuated simultaneously with the welding-hammer for turning the parts to be welded.

2. The combination with an anvil and a hammer, of means, one each side of the hammer and anvil for holding one of the two parts to be welded, mechanism for forcing such holding means toward each other and means actuated simultaneously with the welding-hammer for rocking said holding means.

3. The combination with an anvil and a hammer, of means, one on each side of the hammer and anvil for holding one of the two parts to be welded, mechanism for forcing such holding means toward each other and means actuated simultaneously with the welding-hammer for rocking the parts to be welded on their axis.

4. The combination with an anvil and a hammer, of a rocking cradle, means carried by said cradle, one on each side of the hammer and anvil, for holding the two parts to be welded, mechanism for forcing such holding means toward each other, a drive-shaft, and means connecting the drive-shaft and rocking cradle whereby they are actuated simultaneously.

5. The combination with an anvil and a hammer, of a rocking cradle, means carried by the cradle, one on each side of the hammer and anvil for holding the two parts to be welded, the axis of the parts so held being coincident with the axis of the cradle, mechanism for forcing such holding means toward each other, and means for rocking the cradle.

6. The combination with a hammer and an anvil, of a sectional cradle, one section being fixed against longitudinal movement and the other movable longitudinally, means connecting said sections whereby they are caused to rock simultaneously and rocking means connected to one of said cradle-sections.

7. The combination with a welding device, of means for holding the parts to be welded, the said holding means being located on opposite sides of the welding device, mechanism for forcing such holding means toward each other whereby the parts to be welded are held end to end, and means for rocking the clamps during the welding operation.

8. The combination with welding devices, of a two-part cradle, means carried by the latter for clamping the members to be welded, and means actuated simultaneously with the welding means for rocking the cradle.

9. The combination with welding devices, of two carriages one fixed and the other movable, means for moving the latter one toward and away from the fixed carriage, a sectional cradle mounted in said carriages and means actuated simultaneously with the welding devices for rocking the cradle.

10. The combination with welding devices, of two carriages one fixed and the other movable, means for moving the latter, a sectional cradle mounted in said carriages, holding means carried by said cradle-sections and means actuated simultaneously with the welding means for rocking the cradle.

11. The combination with welding devices, of two carriages one fixed and the other movable, a sectional cradle mounted to rock on said carriages, holding means carried by said cradle-sections and means actuated simultaneously with the welding means for rocking the cradle-sections.

12. The combination with welding devices, of two carriages one fixed and the other movable, means for moving the latter toward and from the fixed carriage, a sectional cradle mounted on said carriages, holding means carried by the cradle-sections, a shaft for actuating the welding means and devices connecting said shaft and the cradle for rocking the latter.

In testimony whereof I have signed this specification in the presence of two subscribing witnesses.

LOUIS ROEHR.

Witnesses:
CHAS. E. VAIL,
FREDERICK A. WALDRON.